US006322332B1

United States Patent
(12) United States Patent
Jensen et al.

(10) Patent No.: US 6,322,332 B1
(45) Date of Patent: Nov. 27, 2001

(54) DEVICE FOR THE EXTERNAL COOLING OF THE ELECTRIC DRIVE MOTOR OF A CENTRIFUGAL PUMP UNIT

(75) Inventors: Niels Due Jensen, Berringbro; Henrik Gerner Olrik, Humlebaek, both of (DK)

(73) Assignee: Grundfos a/s

( * ) Notice: Subject to any disclaimer, the term of this patent is extended or adjusted under 35 U.S.C. 154(b) by 0 days.

(21) Appl. No.: 09/403,916

(22) PCT Filed: Feb. 25, 1999

(86) PCT No.: PCT/DE99/00586

§ 371 Date: Jan. 21, 2000

§ 102(e) Date: Jan. 21, 2000

(87) PCT Pub. No.: WO99/43960

PCT Pub. Date: Sep. 2, 1999

(30) Foreign Application Priority Data

Feb. 28, 1998 (DE) ............................................ 198 08 602

(51) Int. Cl.[7] ...................................................... F04B 17/00

(52) U.S. Cl. ...................................... 417/372; 165/104.13

(58) Field of Search ................................ 417/367, 423.8; 310/64, 58, 52; 165/104.13, 104.21

(56) References Cited

U.S. PATENT DOCUMENTS 2,862,120 * 12/1958 Onsrud .................................. 310/54
3,127,530 * 3/1964 White .................................... 310/54
3,838,947 10/1974 Laing .
4,295,067 10/1981 Binder et al. .
4,516,044 * 5/1985 Bone ...................................... 310/64
4,854,373 * 8/1989 Williams ................................ 165/46
4,930,996 6/1990 Jensen et al. .
5,509,463 * 4/1996 Callaway et al. ...................... 165/46
5,616,973 * 4/1997 Khazanov et al. ..................... 310/54
5,859,482 * 1/1999 Crowell et al. ........................ 310/58
5,906,236 * 5/1999 Adams et al. ......................... 165/46
5,939,808 * 8/1999 Adames ................................ 310/89

FOREIGN PATENT DOCUMENTS 27 19 121 11/1977 (DE) .
37 38 592 5/1989 (DE) .
745976 3/1956 (GB) .
57-62754 4/1982 (JP) .
61-15542 1/1986 (JP) .

* cited by examiner

*Primary Examiner*—Charles G. Freay
*Assistant Examiner*—William Rodriguez
(74) *Attorney, Agent, or Firm*—Jacox, Meckstroth & Jenkins

(57) ABSTRACT

A device for the external cooling of the electrical drive motor of a centrifugal pump unit, which with the motor is advantageously to be assembled above the centrifugal pump, comprises a hermetically closed hollow body of heat-conducting material which circumferentially at least partly surrounds the motor and which with its wall surface on the motor side and on the pump side is in heat-conducting surface contact with the motor and the centrifugal pump, wherein the hollow body is essentially filled with a fluid which transfers the motor heat and which, with a heated motor, is subject to a natural circular convection flow.

9 Claims, 1 Drawing Sheet

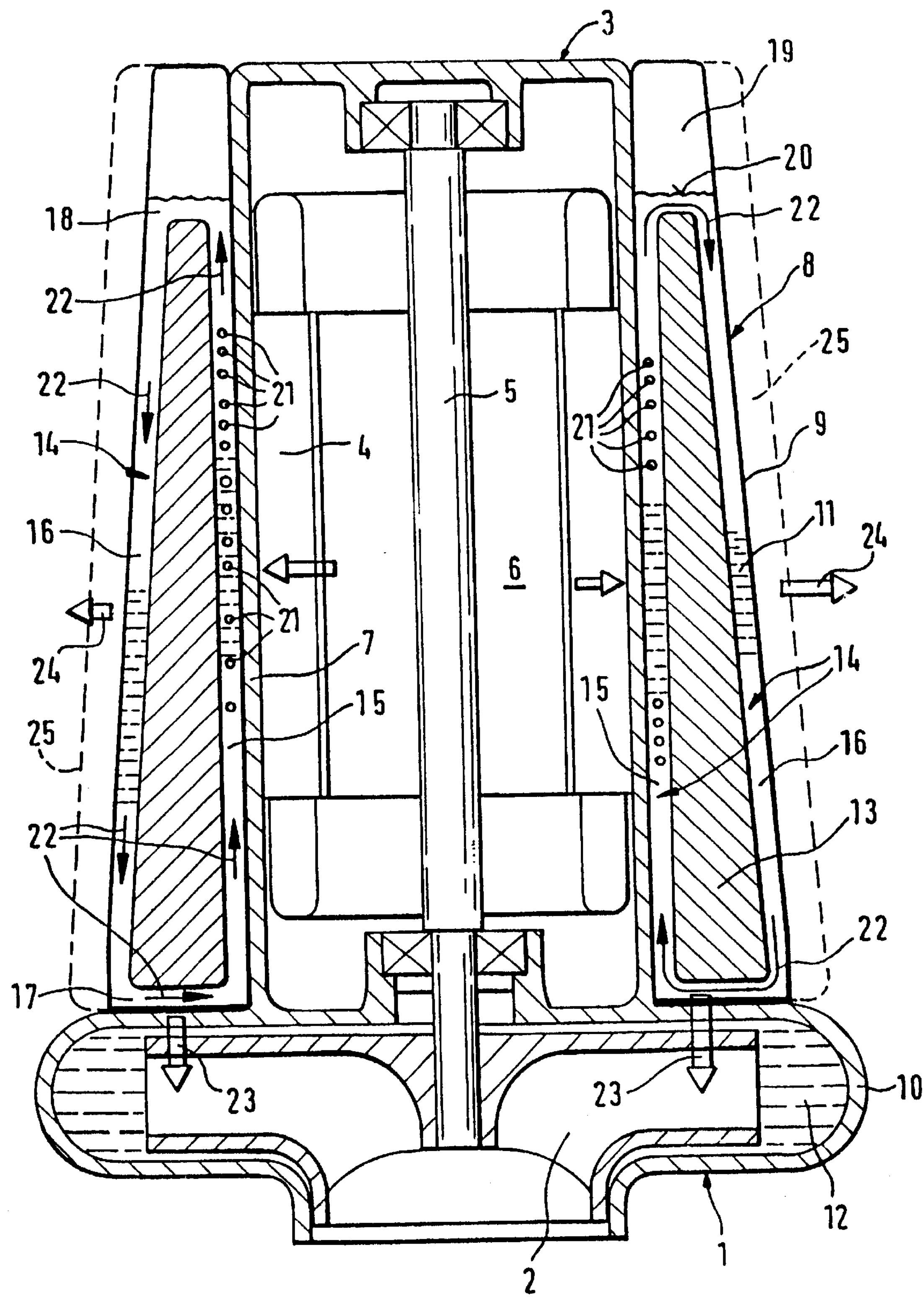
3
19
20
22
18
8
22
25
21
5
22
21
9
14
4
16
11
24
6
21
24
7
14
15
15
25
16
13
22
22
17
23
23
10
12
1
2

DEVICE FOR THE EXTERNAL COOLING OF THE ELECTRIC DRIVE MOTOR OF A CENTRIFUGAL PUMP UNIT

BACKGROUND OF THE INVENTION

The invention proceeds from a device for the external cooling of an electrical drive motor of a centrifugal pump unit.

With centrifugal pump units which for example are applied for the delivery of waste water in hollows, wells or likewise, the leading away of the dissipated heat of the electrically dry-running drive motor is effected via the motor outer surface into the surrounding medium. The centrifugal pump unit is as a rule with the motor above the pump, assembled in the hollow or well and at the beginning of the delivery as a rule is completely submerged into the waste water. After a certain delivery time the motor protrudes from the waste water, and specifically when the level of the water has sunk correspondingly lower. Since the unit is driven in the on-off switching operation, with short running times normally no problems occur.

The situation is different when the units are to be set up dry, i.e. are not to be operated submerged. Since with e.g. motors designed closed for explosion-protective reasons, the motor cooling surfaces increase with the second power of the dimensions, but however the power of the motor increases with the third power, the limit of the application of these units with the removal of the dissipated heat to the surrounding air alone is very quickly reached.

Furthermore it is known to provide the drive motor on the outside with a jacketing surrounding it at a distance and to let the intermediate space thus formed be flowed through by a part flow of the pump delivery flow, which is known as so-called hood cooling. This manner of cooling is suitable however only for delivery mediums which do not contain any dirt components or other fine admixtures or impurities, since otherwise the flow accesses and exits on the pump side get blocked and the hood cooling becomes ineffectual due to this.

BRIEF SUMMARY OF THE INVENTION

The object of the invention lies in the provision of a device for the external cooling of the drive motor of a centrifugal pump unit, wherein the device also guarantees a considerably improved outer cooling of the drive motor also when the motor protrudes out of the delivery medium over a longer time duration.

The solution of this object proceeds from a device previously mentioned and is characterized further in that the device comprises a hermetically closed hollow body of heat-conducting material which circumferentially at least partly surrounds the motor and which with its wall surface on the motor side and on the pump side is in heat-conducting surface contact with the motor and the centrifugal pump, and that the hollow body is essentially filled with a fluid which transfers the motor heat and which, with a heated motor, is subject to a natural circular convection flow.

By way of this solution a considerably improved external cooling of the drive motor of the centrifugal pump unit for delivery of in particular waste water may also be achieved when the drive motor, with the unit in operation, is located for a longer time or permanently out of the liquid delivery medium. The heat produced by the stationary stator of the drive motor is transferred further to the fluid in the hollow body which on one side bears on the surrounding motor wall, and produces therein a liquid circulation. Since the advantageous annular hollow body on the other side at its lower end is in heat-conducting connection with the pump wall and the pump is flowed through by the much colder delivery fluid the heat from the fluid in the hollow space for the larger part gets into the colder delivery fluid in the pump and with this is led away. The remaining part of the heat of the fluid in the hollow body, via the free outer surface of this hollow body, goes into the surrounding air of the drive motor. A further advantage of this device, according to the invention, lies in the fact that the particle like admixtures of the delivery medium do not disadvantageously affect the cooling effect of the hollow body since they may not get into the hollow body.

An advantageous fluid in the hollow body is a mixture of water and another fluid which has a lower boiling point than water. Such a fluid is for example an alcohol. By way of such a fluid mixture the convection flow in the hollow body may be increased. This is the case when the heat transferred from the motor to the cooling liquid in the hollow space effects the creation of small vapor bubbies in the cooling fluid, which rapidly rise upwards and thus increase the circulatory speed of the mixture in the hollow space. The risen vapor bubbles then again condensate in the upper region of the hollow body, which is not filled with fluid.

On the wall region of the hollow body distant to the stator there arises, when the motor in the installed condition is arranged above the centrifugal pump, a downstream flow in the hollow body, by which means the fluid mixture goes downwards to the pump. Here the heat passage to the delivery fluid is effected in the pump. in order to deliver the main part of the developed dissipated heat of the motor to the delivery fluid. Then the fluid mixture again flows upwardly to the wall of the hollow body, which is proximal to the stator, and the mentioned flow procedures and heat transfers are repeated.

In order to further improve the circulation of the convection flow of the fluid or a fluid mixture in the hollow body it may be proceeded that the fluid filling of the hollow body is not more than about 95% of its volumetric capacity and that the remaining space of the hollow body is evacuated of air. By way of this the boiling point of the fluid filling is considerably reduced, so that the vapor bubble formation which encourages the flow sets in considerably earlier.

In order to have a defined flow path for the circulating flow in the hollow body, within the hollow body there is provided a separating wall. By way of this a distinct separation of upstream flow and downstream flow of the heat transferring fluid filling is achieved and it is further achieved that all heated fluid is led to the pump.

A further advantageous formation of the device according to the invention lies in the fact that it is formed as a separate constructional unit, so that it may be assembled at a later time on the motor of the centrifugal pump unit. It is however alternatively also possible to provide the device according to the invention as an integral component of the complete housing of the centrifugal pump unit.

BRIEF DESCRIPTION OF THE DRAWING

The invention is hereinafter described in more detail by way of an embodiment example represented in the accompanying drawing. In this drawing the embodiment example is shown in a single FIGURE in an axial section.

DETAILED DESCRIPTION OF THE INVENTION

The shown embodiment example comprises a centrifugal pump 1 with an impeller 2 and with an electrical drive motor 3 with a stator 4 and a shaft 5 with a rotor 6 assembled thereon. On the shaft 5 of the motor as usual also the impeller 2 of the pump 1 is mounted. The embodiment example is drawn as can be assembled at the place of application, i.e. in a hollow or a well for waste water, i.e. the motor 3 is located for example with a vertically standing shaft 5 above the pump 1.

With the shown example the housing 7 of the motor 3 is surrounded by a device 8 formed as a separate unit, in the form of a hermetically closed, here e.g. annular hollow body 9 of heat-conducting material. With this, the hollow body with its inner wall surface not only bears on the motor housing 7, but with its lower wall surface also on the housing 10 of the pump 1, so that between the wall surfaces, bearing on one another, of the motor housing 7 and of the pump housing 10 as well as of the hollow body 9, there exists a heat-conducting surface contact. In the hollow body 9 there is located a fluid 11 for transferring heat from the motor 3 to the delivery fluid 12 in the pump housing 10, as will become clear.

In order to achieve a large as possible heat removal, the hollow body 9 extends over the whole length of the motor 3. On account of its relatively large height the annular hollow body may be seen as a type of cylindrical ring if one observes the shown axial section of the hollow body. In the middle within the cylindrical annular space of the hollow body there is located a cylindrical wall body 13 which advantageously has such a height which extends roughly over the length of the stator 4 of the motor 3. By the provision of the cylindrical wall body 13, within the hollow body 9 a defined circular flow path 14 for a vertically circulating convection flow of the heat transferring fluid 11 is created. The circular flow path 14 comprises an inner section 15 in which heated fluid 11 flows upwardly, an outer section 16 in which the fluid flows downwards, as well as a short lower transverse section 17 and a short upper transverse section 18, by which means the long sections 15 and 16 are connected to one another.

The hollow body 9 is essentially filled with the heat-transferring fluid 11 so that a smaller hollow space 19 is present. The degree of filling is about up to 90% of the containing capability of the hollow space, this is indicated in the drawing at 20. In any case the filling on application of an inner wall body 13 for forming the flow paths 15 to 18 is designed such that fluid flows over the upper end of the separating wall 13. Thus the upper, e.g. annular hollow space 20 remains in the hollow body 9 which is either filled with air or also evacuated, by which means the vapor bubble formation within the heated, rising fluid 11 particularly in the last case is simplified.

The fluid used in the hollow body 9 may be water. It may however also be a mixture of water or another fluid which has a lower boiling point than water. By way of this a simplified creation of vapor bubbles in the fluid 11 is effected, which in turn has the result that by way of the created vapor bubbles in the inner flow section 15 of the circular flow path 14, in the latter a quicker flow and thus a quicker removal of the heat is effected.

A preferred fluid with a low boiling point is alcohol. With such mixtures the alcohol at atmospheric pressure boils according to the mixed ratio already at about 80° C. Since the vaporization heat of the alcohol is only half that of the water, the vapor bubble formation sets in relatively early and improves the convection flow when the heat transfers from the stator 4 of the motor to the fluid 11 in the hollow body 9. Furthermore alcohol ensures a protection from freezing for the cooling fluid.

In place of water, alone also an alcohol may be selected. Furthermore it is also possible in the case of water as a mixing partner to select a different fluid mixing partner, e.g. likewise alcohol. The mixing partners are to be selected such that at the same pressure they have differing vapor pressure curves and that the vaporization heat of the partner boiling at a lower temperature lies below that of the partner boiling at a higher temperature.

The cooling procedure for the motor with the above described centrifugal pump unit takes place as follows. The motor 3 in particular heated by the stator 4 conducts its dissipated heat transversely through the cylindrical motor housing wall 7 and through the inner wall of the hollow body 9 to the fluid 11 which is located in the inner section 15 of the circular flow path 14. As a result of the heat transfer the fluid 11 is heated in which, in particular when it contains alcohol, there forms vapor bubbles which rise in the section 15 and by way of this set the fluid into a quick upward movement. This rapid movement is of course transmitted to the downwardly directed flow section 16 of the circular flow path 14 and ensures that within the whole circular flow path there is formed an increased circulatory speed. The course of flow in the circular flow path 14 is indicated with the arrows 22. If the vapor bubbles 22 have arrived above at the fluid border 19 they condense again. Thus it is ensured that on the outer flow section 16 of the circular flow path 14 fluid only moves downwards.

As soon as the heated fluid 11 below flows radially inwards past the pump housing 10, in this region there takes place a passage of heat through the pump-side walling of the hollow body 9 and through the pump housing to the delivery fluid 12 in the pump 1, which is indicated with arrow 23. With the delivery fluid 12 this dissipated heat is then led away, wherein the component of the dissipated heat led away in this manner is about 70%. The remaining component of the dissipated heat of about 30% according to the arrow 24 is essentially led away via the outer wall of the hollow body 9 to the surroundings, air or water, when the heated fluid is located on the outer flow section 16.

The device 8 may not only be formed as a separate constructional unit which externally can be attached on the centrifugal pump unit 1, 3 but may also be formed as an integral component of the whole housing of the unit. The hollow body 9 of the device may further be provided with an outer ribbing 25 in order to increase the heat removal taking place here.

In a further formation the housing 9 may also have shapes other than the represented annular shape. It may for example have a segment shape in cross section wherein one or more of Such segment housings may be arranged around the motor. For example such a segment housing may be formed as a half-shell, and two such half-shells may surround the motor. In a few cases of application it may be sufficient that the motor circumferentially is only partly surrounded by a hollow body filled with heat transferring fluid, i.e. that e.g. only one half-shell or one segment housing is required. Each hollow body per se forms a closed system in which the described heat transfer circuit is present.

Although furthermore a vertical or an essentially vertical operating position of the motor may be very advantageous, as is described further above, also positions of the motor deviating from this may be selected. Also with such more or less oblique or inclined operating positions of the unit 1, 3 a good removal of the dissipated heat of the motor 3 to the delivery fluid of the centrifugal pump 1 is achieved.

From the above it results that with the delivery fluid 12 of the pump 1 a highly effective heat sink is also available when in particular the motor 3 of the centrifugal pump unit 1, 3 is located outside of the fluid to be delivered, in particular waste water. The cooling effect on the motor 3 is particularly strong when the heat-transferring fluid 11 in the hollow body 9 circulates with a relatively high circulatory speed. With this, the formation of vapor bubbles in the inner flow section 15 of the circular flow path 14 acts to strongly support this.

While the apparatus and methods described herein, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. A device for the external cooling of an electrical drive motor of a centrifugal pump unit, said device comprising a hermitically closed hollow body of heat-conducting material, which circumferentially at least partly surrounds the motor and which with its wall surface on a motor side and on the pump side is in heat-conducting surface contact with the motor and the centrifugal pump, and said hollow body being essentially filed with a fluid which transfers the motor heat and which, with a heated motor, is subject to a natural circular convection flow; and wherein within the hollow body a wall body for forming a defined circular flow path for a circulating convection flow is provided.

2. A device according to claim 1, said heat transferring fluid comprising a mixture with differing vapor pressure curves and wherein the vaporization heat of the mixture part boiling at a lower temperature lies below that of the mixture part boiling at a higher temperature.

3. A device according to claim 2, said mixture comprising water and an alcohol, which increases the convection flow by way of its vaporization and condensation phase change.

4. A device according to claim 1, said fluid filling of the hollow body comprising up to 95% of its volumetric capacity.

5. A device according to claim 4, said space of the hollow body which is not filled with fluid is evacuated and contains vapors of the fluid in the hollow body.

6. A device according to claim 1, said hollow body extending over the whole length of the motor.

7. A device according to claim 1, said hollow body being formed as a separate constructional unit which externally can be attached on the centrifugal pump unit.

8. A device according to claim 1, said hollow body being an integral part of the housing of the centrifugal pump unit.

9. A device according to claim 1, said hollow body comprises an outer ribbing.

* * * * *